United States Patent
Bucher et al.

(10) Patent No.: US 7,256,898 B2
(45) Date of Patent: Aug. 14, 2007

(54) METHOD AND DEVICE FOR DETERMINING THE POSITION OF ROTATIONALLY DRIVABLE TOOLS

(75) Inventors: Heribert Bucher, Tettnang (DE); Wolfgang Reiser, Vogt (DE)

(73) Assignee: Blum-Novotest GmbH, Grunkraut (DE)

( * ) Notice: Subject to any disclaimer, the term of this patent is extended or adjusted under 35 U.S.C. 154(b) by 435 days.

(21) Appl. No.: 10/784,069

(22) Filed: Feb. 19, 2004

(65) Prior Publication Data

US 2004/0165197 A1    Aug. 26, 2004

Related U.S. Application Data

(63) Continuation of application No. PCT/EP02/09183, filed on Aug. 16, 2002.

(30) Foreign Application Priority Data

Aug. 20, 2001 (DE) ................. 101 40 822

(51) Int. Cl.
G01B 11/14 (2006.01)
B23B 49/00 (2006.01)
B23G 1/00 (2006.01)
(52) U.S. Cl. ....................... 356/614; 408/16
(58) Field of Classification Search ............... None
See application file for complete search history.

(56) References Cited

U.S. PATENT DOCUMENTS

| 3,749,500 | A | * | 7/1973 | Carlson et al. ......... 356/638 |
|---|---|---|---|---|
| 3,900,738 | A | | 8/1975 | McKay, Sr. |
| 4,018,113 | A | | 4/1977 | Blazenin et al. |
| 4,021,119 | A | * | 5/1977 | Stauffer ................... 356/638 |
| 4,576,482 | A | * | 3/1986 | Pryor ...................... 356/612 |
| 4,966,460 | A | * | 10/1990 | Kahley ..................... 356/640 |
| 5,004,930 | A | * | 4/1991 | Gremaud et al. ....... 250/559.14 |
| 5,005,978 | A | * | 4/1991 | Skunes et al. ............ 356/625 |
| 5,930,143 | A | * | 7/1999 | Savazzi .................... 700/195 |
| 6,583,883 | B2 | * | 6/2003 | Egelhof .................... 356/601 |
| 6,597,464 | B2 | * | 7/2003 | Bucher et al. ............ 356/638 |

(Continued)

FOREIGN PATENT DOCUMENTS

DE        3905949 A1        8/1990

(Continued)

OTHER PUBLICATIONS

Rall, Klaus et al., The Measurement of Rotating Tools in HSC Milling Machines, Innovative Technologien, ZWF 93, 4, pp. 127-130 (1998).

*Primary Examiner*—Layla G. Lauchman
*Assistant Examiner*—Gordon J. Stock, Jr.
(74) *Attorney, Agent, or Firm*—Woodard, Emhardt, Moriarty, McNett & Henry LLP

(57) ABSTRACT

To determine the position of rotationally drivable tools in machine tools, the moment of separation of the tool to be measured and a measuring beam, for example a laser beam of a light barrier, is used. The tool to be measured is first positioned in such a manner that the measuring beam is interrupted, and is then moved to a measuring position in which the moment of separation of the tool and the measuring beam occurs, and the measuring beam is no longer interrupted by the tool during at least one complete revolution. The moment of separation is used to determine the position of the tool.

8 Claims, 2 Drawing Sheets

U.S. PATENT DOCUMENTS

Figure 1:
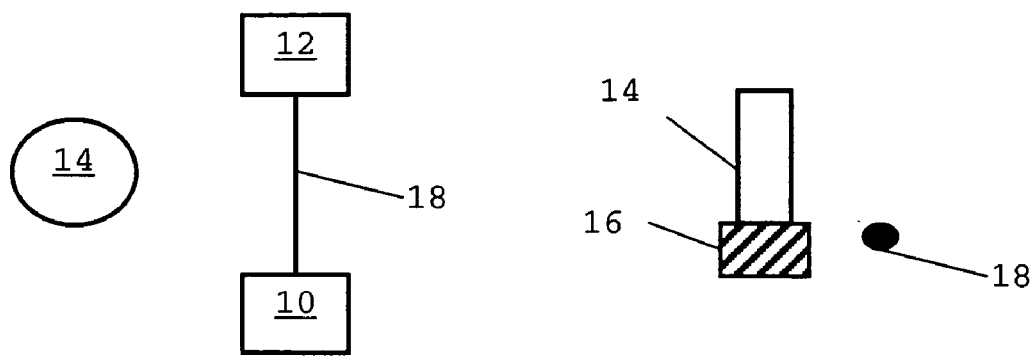

| | | | |
|---|---|---|---|
| 7,175,509 B2 * | 2/2007 | Gunjima et al. | 451/56 |
| 2006/0232791 A1 * | 10/2006 | Turrini | 356/621 |

FOREIGN PATENT DOCUMENTS

| | | |
|---|---|---|
| DE | 4238504 A1 | 5/1994 |
| DE | 19851411 A1 | 5/2000 |
| WO | WO 01/28737 A1 | 4/2001 |
| WO | WO 01/38822 A1 | 5/2001 |

* cited by examiner

METHOD AND DEVICE FOR DETERMINING THE POSITION OF ROTATIONALLY DRIVABLE TOOLS

This is a continuation of International Application PCT/EP02/09183 with an international filing date of Aug. 16, 2002.

The present invention relates to the measurement of rotationally drivable tools and in particular the determination of the position of a rotationally drivable tool in a machine tool.

To determine the position of a rotating tool in machine tools for machining, it is known to use light barriers and in particular laser light barriers. During this procedure, the tool to be measured is moved in the direction towards the measuring beam, the moment at which the tool interrupts the measuring beam being used to calculate the position of the tool in the machine tool. When the measuring beam is interrupted, the light barrier outputs a signal indicating the moment of the beam interruption to a control system of the machine tool. At the moment of the beam interruption, the current axis positions of the machine tool are detected by its control system and, using a calibration assigned to the tool concerned, are used to determine the current position of the tool.

A disadvantage of this procedure is that it is not possible to distinguish between interruptions of the measuring beam on account of the tool and beams interruptions on account of particles present in the region of the tool (e.g. drops of coolant, flying chips, splashes of lubricant, etc.). This may lead to inaccurate or incorrect measurements with no longer tolerable uncertainties and even termination of the measuring operation and stoppage of the machine.

The object of the present invention is to provide a solution to avoid the interfering influences of (air-contaminating) particles situated in the region of a rotationally drivable tool to be measured when determining the position of the tool in a machine tool.

To achieve this object, the present invention provides a method and device in which the moment of separation of a tool to be measured and a measuring beam is used to determine the position of the tool.

The present invention serves for determining the position of rotationally drivable tools in machine tools for machining (e.g. turning, planing, milling, drilling/boring, countersinking/counterboring, reaming, grinding, eroding and the like).

In the method according to the invention for determining the position of a rotationally drivable tool, the latter is positioned in a measuring beam in such a manner that the beam path of the latter is interrupted. Hereinbelow, the interruption of the measuring beam by the tool is understood to mean a state in which the tool at least partially shades the measuring beam. A definition of this may be, for example, that an interruption of the measuring beam exists when the measuring beam is completely blocked by the tool or an amount of light energy which exceeds a predetermined limit value is let through. Such a limit value may be defined, for example, in dependence on the amount of light energy which is at least required to output a signal by means of a receiver which is used for the measuring beam and indicates the reception of the measuring beam. For example, an interruption may exist when a partial shading of the measuring beam by the tool leads to an amount of light energy let through equal to 50% of the amount of light energy emitted.

To define this starting position, the known, approximate measurements of the tool to be measured can be used. This positioning can also be achieved by the tool being moved, by activating single or plural axes of the machine tool, in the manner of a searching movement until the tool is situated in the measuring beam. During or after this, the tool is rotated.

In addition, a movement direction for determining the position is chosen. This may, for example, be the axial direction of a drill to be measured, or the direction of a radius if a milling cutter is to be measured.

After this, the tool is moved relative to the measuring beam, at a chosen velocity which is as constant as possible, in a direction away from it, i.e. a movement of the tool in the chosen movement direction is effected. During this, the tool is moved to a position, referred to as the measuring position hereinbelow, in which the beam path of the measuring beam is no longer interrupted by the tool, i.e. the tool is separated from the measuring beam. The moment of separation is reached when the interruption of the measuring beam by the tool leads to a (partial) shading in which the amount of light energy let through is sufficient to trigger a signal of the receiver. This amount of light energy may be defined as in the above positioning of the tool in the measuring beam or may differ from this.

The measuring position is detected, for example using axis positions determined by a control system of a machine tool, and used to determine a position for the tool. The measuring position, i.e. the moment of separation, is detected when the measuring beam is not interrupted for at least one revolution of the tool.

In order to determine the tool position from the measuring position, the position of the measuring beam relative to the machine tool and the tool, quantities of a (previously performed) calibration for the machine tool and the measuring beam, is employed.

Preferably, the tool is initially positioned in the measuring beam in such a manner that the beam path of the latter is interrupted permanently, periodically, at predetermined instants or at predetermined time intervals.

Preferably, the tool is rotated at a rotational speed which is relatively high in relation to the movement velocity in order to minimise the measuring error when detecting the moment of separation of tool and measuring beam on account of the tool rotation. In this regard, it is possible to correct the measuring error in dependence on the measuring speed for the measuring beam and the delay time which results from the rotational speed and the movement velocity of the tool.

Furthermore, the determined position of the tool can be used to calculate its geometry.

Exemplary embodiments of the invention are described below with reference to the appended figures, in which:

FIG. 1 shows schematic illustrations of a measuring arrangement for determining the position of a rotationally drivable tool using a measuring beam, and FIGS. 2 to 5 show schematic illustrations of the implementation of the method according to the invention.

As sketched in FIG. 1, a measuring device having a transmitter 10 and a receiver 12 is used to determine the position of a rotationally drivable tool denoted as a whole by 14, and in particular its region 16 to be used for machining, in a machine tool (not illustrated). The measuring device includes a light barrier with a measuring beam 18, which is a light beam with collimated beam path or a laser beam.

Figure 2:
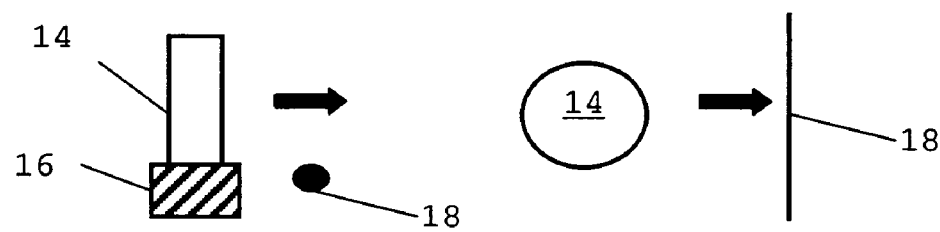
Figure 3:
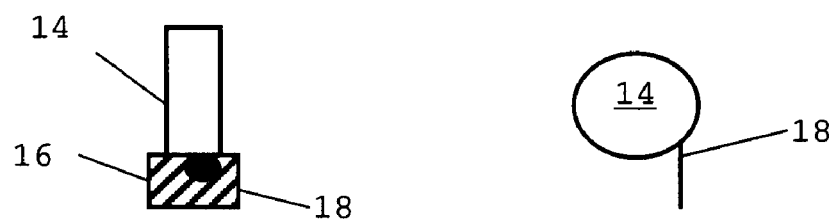

The region 16 of the tool 14 is moved, according to FIG. 2, in the direction of the arrow illustrated therein towards the measuring beam 18 until the latter is interrupted, according to FIG. 3, by the region 16. Accordingly, the receiver 12 outputs a signal indicating the interruption of the measuring beam 18.

Figure 4:
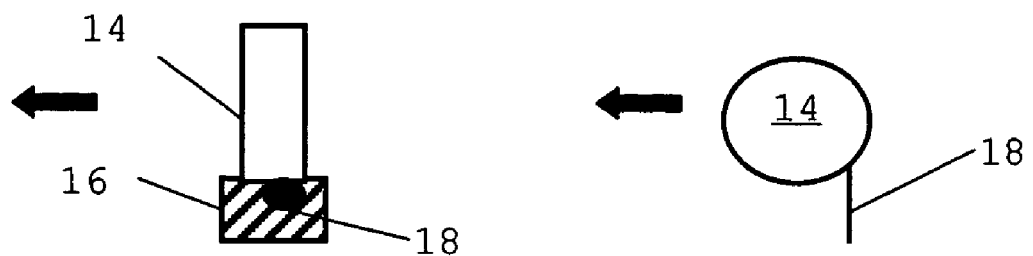

At this instant at the latest, the tool 14 is rotated and moved away from the measuring beam 18, for example at a rotational speed which is preset, constant and as high as possible and/or a velocity which is preset, constant and as low as possible. This movement chosen for determining the position can, as illustrated in FIG. 4, be effected opposite the direction of movement according to FIG. 2, i.e. in the direction of the arrow shown in FIG. 4, or in the opposite direction. During this procedure, the tool 14 is moved away from the measuring beam 18 in such a manner that the measuring beam 18, seen in relative terms, moves to a region of the machining region 16 which is suitable for determining the position of the tool 14.

Figure 5:

When, as illustrated in FIG. 5, the tool 14 is separated from the measuring beam 18, i.e. the instant substantially immediately after the interruption of the measuring beam 18 by the machining region 16 has ended, the receiver 12 generates a corresponding signal, upon which the axis positions of the machine tool are detected. In particular, the moment of separation of the tool 14 and the measuring beam 18 is defined as the moment at which the measuring beam 18 is for the first time no longer interrupted for a complete revolution of the tool 14.

Accordingly, the instant at which the axis positions of the machine tool are detected is delayed by a period of time which depends on the duration of a complete revolution of a tool 14 and the movement velocity. In order to compensate for this influence on the accuracy of the determination of the position of the tool 14, a correction factor is calculated from the rotational speed and the movement velocity of the tool 14. Furthermore, the delay times which are caused by the individual components of the measuring device, result during the processing of signals of the measuring device and occur during the determination of the axis positions are taken into account in the correction. In order to minimise the influence of the tool rotation and movement on the measuring result, a high rotational speed in comparison with the movement velocity is advantageous.

The invention claimed is:

1. Method of determining the position of a rotationally drivable tool used in machining so that the position may be used in continued machining, having the following steps:
   providing a measuring beam (18),
   rotating a rotationally drivable tool (14),
   choosing a movement direction,
   moving the tool (14) in the chosen direction, away from the measuring beam (18), to a measuring position in which the tool (14) is separated from the measuring beam (18),
   detecting the measuring position, and
   determining the position of the tool (14) from the measuring position so that the position may be used in continued machining, wherein
   the tool (14) is positioned in the beam path of the measuring beam (18) before it is moved away from the measuring beam (18), and
   the measuring position is detected for a position of the tool (14) in which the measuring beam (18) is not interrupted during at least one revolution of the tool (14).

2. Method according to claim 1, in which the tool (14) is positioned in the beam path of the measuring beam (18) in such a manner that the measuring beam (18) is interrupted.

3. Method according to claim 1, in which the tool (14) is positioned in the beam path of the measuring beam (18) in such a manner that the measuring beam (18) is periodically interrupted by the rotating tool (14).

4. Method according to claim 1, in which the tool (14) is rotated at a predetermined rotational speed.

5. Method according to claim 1, in which the tool (14) is moved at a predetermined velocity.

6. Method according to claim 1, in which the moving of the tool (14) away from the measuring beam (18) is ended when the measuring position is reached.

7. Method according to claim 1 wherein the step of providing a measuring beam includes providing an optical measuring device having a transmitter for emitting a measuring beam and the step of detecting the measuring position includes providing the optical measuring device also having a receiver for selectively receiving the measuring beam.

8. Method of determining the position of a rotationally drivable tool used in machining so that the position may be used in continued machining, having the following steps:
   providing a measuring beam (18),
   rotating a rotationally drivable tool (14),
   choosing a movement direction,
   moving the tool (14) in the chosen direction, away from the measuring beam (18), to a measuring position in which the tool (14) is separated from the measuring beam (18),
   detecting the measuring position, and
   determining the position of the tool (14) from the measuring position so that the position may be used in continued machining, wherein
   the tool (14) is positioned in the beam path of the measuring beam (18) before it is moved away from the measuring beam (18), and
   the measuring position is detected for a position of the tool (14) in which the measuring beam (18) is not interrupted during at least one revolution of the tool (14), and
   the tool position is determined in dependence on the rotational speed and the movement velocity of the tool (14).

* * * * *